July 9, 1929. F. C. MORRIS Re. 17,372

STEERING COLUMN BUSHING

Original Filed Dec. 21, 1927

INVENTOR
Fred C. Morris

BY
Harness, Dickey & Pierce
ATTORNEY

Reissued July 9, 1929.

Re. 17,372

UNITED STATES PATENT OFFICE.

FRED C. MORRIS, OF SAN FRANCISCO, CALIFORNIA.

STEERING-COLUMN BUSHING.

Original No. 1,679,941, dated August 7, 1928, Serial No. 241,520, filed December 21, 1927. Application for reissue filed November 1, 1928. Serial No. 316,561.

This invention relates to an anti-rattling bushing for steering columns of motor cars of various types, and its object is to prevent the hammering out of such bushings as well as to prevent them from making a noise as the parts of the car become worn.

It will be understood by those skilled in the art that if metal bushings are used in the steering columns of motor cars that their wear is largely due to a hammering action which in time gets the bushing out of round and causes the steering wheel shaft to rattle still more rather than from any wear due to the rotation of the shaft itself. Various types of bushings have been produced to avoid this hammering action, but a number have defects which this type of bushing corrects.

One object of the invention is to provide a rubber cushion for the outside of the actual bearing for the shaft, which will prevent hammering, and to provide that rubber cushion of such a shape as to prevent it from contacting with the shaft, as well as to cause it to direct any oil that may be poured into the shaft bearing to the proper place rather than to run down on the rubber and rot it out.

Another object of the invention is to produce a bushing which can be easily assembled, no vulcanization of the bushing on the rigid steel or metal foundation being necessary, the metal foundation having its surface knurled both inside and outside to cause the compressed fabric bushing used inside it, and the rubber cushion outside the same to cling thereto securely.

Another object of the invention is to make use of a fabric which has been hydraulically compressed to such an extent that it cannot be compressed any further, for if the wearing surface of the bushing is of substantially incompressible fabric it will be just large enough to slip the steering column shaft therethrough without in any way expanding upon the fabric, and thereby interfering with its rotation.

Another object of the invention is to provide a soft rubber outer cover for the metallic part of the bushing which will have its inner portion so beveled that it will direct any oil poured into the bushing to the bearing surface, and said rubber bushing will be molded small enough so that it will tightly hold on the knurled outside of the metal bushing and cannot easily be dislodged therefrom.

Other objects of the invention will be apparent as the description proceeds.

An embodiment of the invention is shown in the accompanying drawings in which the same reference numeral is applied to the same portion throughout the several figures of the drawings, and of which there may be modifications.

Figure 1:
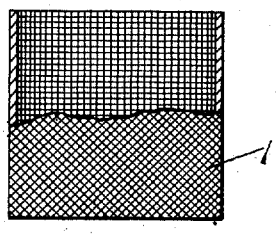
Figure 1 is a side elevation of the metal bushing used, a portion thereof being broken away for the purpose of showing the inner and outside knurling.
Figure 2:
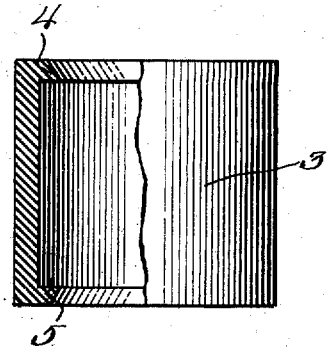
Figure 2 is a side elevation of the outside rubber bushing used, a portion being broken away to show the construction thereof.
Figure 3:
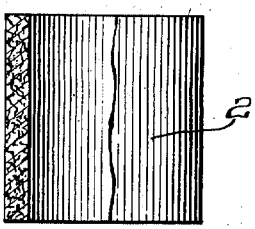
Figure 3 is a side elevation of the incompressible lubricated fabric used inside the metal bushing.
Figure 4:
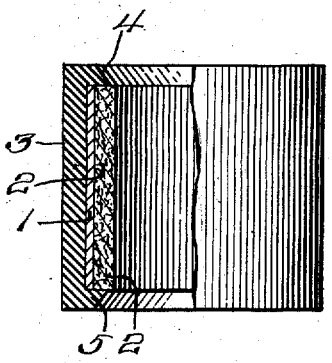
Figure 4 is a side elevation of the complete bushing, a portion broken away to show one side section.

The numeral 1 indicates the foundation of the bushing, and it consists of a metal sleeve of suitable thickness knurled both inside and outside to hold the other two parts against displacement. The numeral 2 indicates a compressed fabric bushing which has a small percentage of graphite worked into the same during its construction, and which is produced under hydraulic pressure so great as to make the sleeve incompressible upon its completion. This sleeve is then tightly forced into the bushing 1 and because of the roughness of said bushing will retain its place therein without displacement.

The numeral 3 indicates the outer softer rubber covering for the bushing 1. This covering is for the purpose of giving the necessary deadening effect to the hammering of the steering shaft on the bearing supporting it. It is provided with two inturned beveled flanges as indicated at 4 and 5 which flanges reach over on the incompressible fabric bushing 2 to within about one-sixteenth of an inch of the movable shaft so that if any oil is dropped on the shaft it will be sure to run down between the fabric 2 and the shaft, rather than between the rubber and metal bushing.

In actual practice the rubber bushing 3 is made slightly smaller in diameter than the bushing 1, the object being to cause it and its flanges 4 and 5 to tightly grip the bushing 1. In the present construction advantage is taken of the forcing of the bushing 2 into the shell 1, and the placing of the rubber covering 3 over the shell 1 sufficiently tight to hold both parts in place, thereby dispensing with any necessity for any additional vulcanizing steps, while the roughening of the shell 1 holds the several parts of the bushing tightly together thereby greatly reducing the cost of manufacture.

Ordinarily the compressed fabric bushing will be from one-sixteenth to one-eighth of an inch thick, and in the finished article the opening therethrough is made about 3/1000 larger than the shaft with which it is used so that the shaft is perfectly free to rotate therein with substantially no friction due to expansion of the compressed fabric.

Having thus described my invention, what I desire to secure by Letters Patent of the United States is as follows, but modifications may be made in carrying out the invention as shown in the drawings and in the above particularly described form thereof, within the purview of the annexed claims.

What I claim is:

1. A bushing for motor car steering wheels comprising a bushing knurled inside and outside, a fabric bushing within the knurled bushing, and a rubber covering for the knurled bushing.

2. A bushing for motor car steering gears comprising a knurled metallic bushing, a substantially incompressible fabric bushing forced into the knurled bushing, and a rubber bushing encompassing the knurled bushing, and a portion of the ends of the fabric bushing.

3. A bushing for motor car steering gears comprising a knurled metallic bushing, a fabric bushing forced into the knurled bushing, and a rubber bushing tightly encompassing the knurled bushing, a portion of the rubber bushing extending over the ends of the other two bushings.

4. A bushing comprising, in combination, a rigid shape maintaining shell provided with a roughened surface, a fabric shell overlying said surface and fixed relative thereto, and a soft rubber shell overlying and fixed to that surface of said rigid shell opposite to that to which said fabric shell is fixed.

5. A bushing comprising, in combination, a rigid shape maintaining shell provided with a rough surface, a soft rubber shell overlying said surface and fixed relative thereto, and a fabric shell overlying and fixed to that surface of said rigid shell opposite to the surface to which said rubber shell is fixed.

6. A bushing comprising, in combination, a rigid shape maintaining shell provided with roughened inner and outer surfaces, a fabric shell fixed relative to one of said surfaces, and a soft rubber shell fixed relative to the other of said surfaces.

7. A bushing comprising a rigid metallic sleeve provided with a fabric lining and a soft rubber covering.

8. A bushing comprising, in combination, a rigid metallic sleeve, a fabric sleeve secured thereto interiorly thereof, and a soft rubber sleeve secured to said metallic sleeve exteriorly thereof.

9. A bushing comprising, in combination, a rigid metallic sleeve, a fabric cover for one surface thereof secured thereto, and a soft rubber cover for the opposite surface thereof secured thereto.

10. A bushing comprising, in combination, a rigid shape maintaining portion, a fibrous bearing portion secured thereto, and a resilient cushioning portion secured to said rigid portion on the surface thereof opposite to that to which said fibrous portion is secured.

11. A bushing comprising, in combination, a rigid shape maintaining sleeve lined with fabric and covered by a shell of soft rubber, an end of said bushing being beveled whereby when said bushing is disposed with its axis at an angle to the horizontal and with said beveled surface uppermost, oil draining onto said beveled surface will be directed into contact with said fabric.

12. In a bushing, in combination, a rigid shape maintaining shell, a fabric bearing liner for said shell extending radially inwardly beyond all parts of said shell, and a rubber cover for said shell extending radially outwardly beyond all parts of said shell.

13. A bushing comprising a rigid shape maintaining shell completely insulated interiorly and externally by a non-rigid material, said material on one side of said shell comprising a bearing fabric, and said material on the other side of said shell comprising soft rubber.

FRED C. MORRIS.